United States Patent
Sterbenz et al.

(10) Patent No.: US 11,124,269 B2
(45) Date of Patent: Sep. 21, 2021

(54) BICYCLE DERAILLEUR APPARATUS FOR CONTROLLING BICYCLE SPEED

(71) Applicant: Ford Global Technologies, LLC, Dearborn, MI (US)

(72) Inventors: Scott Sterbenz, Brownstown, MI (US); Eric MacLean, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 337 days.

(21) Appl. No.: 16/390,942

(22) Filed: Apr. 22, 2019

(65) Prior Publication Data

US 2020/0331556 A1 Oct. 22, 2020

(51) Int. Cl.
*B62M 9/124* (2010.01)
*B62M 9/127* (2010.01)
(Continued)

(52) U.S. Cl.
CPC ............ *B62M 9/124* (2013.01); *B62M 9/121* (2013.01); *B62M 9/122* (2013.01); *B62M 9/127* (2013.01);
(Continued)

(58) Field of Classification Search
CPC ...... B62M 9/121; B62M 9/122; B62M 9/123; B62M 9/124; B62M 9/127; B62M 9/1242;
(Continued)

(56) References Cited

U.S. PATENT DOCUMENTS

| 3,453,899 A | * | 7/1969 | Nagano | B62M 9/127 474/82 |
| 5,894,759 A | * | 4/1999 | Nakamura | B62M 9/122 74/473.13 |

(Continued)

FOREIGN PATENT DOCUMENTS

GB 2464918 A 5/2010

OTHER PUBLICATIONS

Woodford, C. "Electric bicycles." Explain that Stuff, Sep. 22, 2018 (12 pages). Retrieved from https://www.explainthatstuff.com/electricbikes.html.

*Primary Examiner* — Michael R Mansen
*Assistant Examiner* — Raveen J Dias
(74) *Attorney, Agent, or Firm* — Brandon Hicks; Eversheds Sutherland (US) LLP (57) ABSTRACT

A bicycle derailleur apparatus for controlling bicycle speed includes a bicycle chain guide and a pair of moldable wires. The guide has opposite sides receiving a bicycle chain therebetween and is pivotally movable in a lateral direction toward and away from a bicycle frame portion mounting the guide. The moldable wires, disposed side-by-side and spaced apart, are mounted to the bicycle frame portion and have respective outer end portions attached to one guide side. By applying a predetermined electric current to the moldable wires at separate times their outer end portions deform from pliable states to respective acute and obtuse angular shapes relative to respective main portions thereof and thereby move the guide to shift the bicycle chain into engagement with one or the other of inner and outer derailleur sprocket gears of different diameter sizes to change the bicycle speed relative to the pedal cadence of a rider.

20 Claims, 5 Drawing Sheets

(51) Int. Cl.
*B62M 9/121* (2010.01)
*B62M 9/122* (2010.01)
*B62K 23/02* (2006.01)
*B62M 6/45* (2010.01)
*B62M 9/123* (2010.01)

(52) U.S. Cl.
CPC ............... *B62K 23/02* (2013.01); *B62M 6/45* (2013.01); *B62M 9/123* (2013.01)

(58) Field of Classification Search
CPC .... B62M 9/1248; B62M 9/125; B62M 9/126; B62M 9/131; B62M 9/132; B62M 9/133; B62M 9/134; B62M 9/137
See application file for complete search history.

(56) References Cited

U.S. PATENT DOCUMENTS

| | | | |
|---|---|---|---|
| 6,305,237 B1 * | 10/2001 | Ichida | B62M 9/122 474/101 |
| 7,503,547 B2 | 3/2009 | Yoshida et al. | |
| 2012/0086183 A1 | 4/2012 | Ken | |
| 2012/0306327 A1 | 12/2012 | Lee et al. | |
| 2013/0054065 A1 | 2/2013 | Komatsu | |
| 2016/0318582 A1 * | 11/2016 | Johnson | B62K 23/04 |
| 2017/0101155 A1 * | 4/2017 | Tachibana | H04W 4/70 |
| 2017/0101162 A1 * | 4/2017 | Tachibana | B62M 25/08 |
| 2018/0180640 A1 * | 6/2018 | Miglioranza | G01P 3/66 |

* cited by examiner

BICYCLE DERAILLEUR APPARATUS FOR CONTROLLING BICYCLE SPEED

FIELD

The disclosure is directed to bicycles and more particularly to a bicycle derailleur apparatus for controlling bicycle speed.

BACKGROUND

A bicycle typically has an endless chain for transmitting a driving force from an intermediately-located rider-operated pedal crankset to a rear wheel of the bicycle. The bicycle may also have a derailleur supported from a frame of the bicycle adjacent to the chain to change the speed of the bicycle by shifting the chain from one to another of a plurality of derailleur sprocket gears of different diameter sizes mounted, in spaced apart and side-by-side relation to one another, at least at either of the pedal crankset or the rear wheel. The bicycle derailleur is typically operated by a bicycle rider manually manipulating a lever on the bicycle handlebar, being connected by a cable to the derailleur, to shift the bicycle chain from one to another of the derailleur sprocket gears to thereby change the speed of the bicycle relative to a given pedal cadence (pedals-cycles per minute) of the rider.

A bicycle used by a casual rider is commonly equipped with a derailleur employing just two sprocket gears, an inner one located adjacent to the bicycle and larger in diameter than an outer one located remote therefrom. Operation of the derailleur by the bicycle rider selectively moves the bicycle chain in a lateral direction to selectively engage either the inner or outer sprocket gear and thereby enable the rider to pedal the bicycle at a faster or slower speed relative to the desired pedal cadence. A typical pedal cadence of a casual rider may be 60 ppm (pedals-cycles per minute).

Automatic bicycle derailleur chain shifting control apparatuses of various designs have been proposed in the past. However, due to drawbacks in terms of design complexity, excess weight and/or relatively high cost, these apparatuses have experienced only limited acceptance for incorporation on bicycles commonly purchased by casual riders.

DETAILED DESCRIPTION

The following detailed description is merely exemplary in nature and is not intended to limit the described embodiments or the application and uses of the described embodiments. Like reference numerals herein refer to like parts throughout the several views of the drawings. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-5, there is illustrated an exemplary embodiment of a bicycle derailleur apparatus, generally designated 100, for controlling the speed of a bicycle (not shown). The bicycle derailleur apparatus 100 basically incorporates a bicycle chain guide 102 and at least one pair of moldable wires 104, 106. The bicycle derailleur apparatus 100 may be incorporated into the derailleur at the pedal crankset, the derailleur at the rear wheel, or both. That is, a bicycle may incorporate one or multiple bicycle derailleur apparatuses 100 thereon. The bicycle chain guide 102 may be pivotally supported at an outer end of a hanger 108 being attached at an inner end to an upright frame portion 110 of the bicycle. The bicycle chain guide 102 is movable such as by undergoing a tilting motion in a generally lateral direction toward and away from the bicycle frame portion 110.

Figure 1:
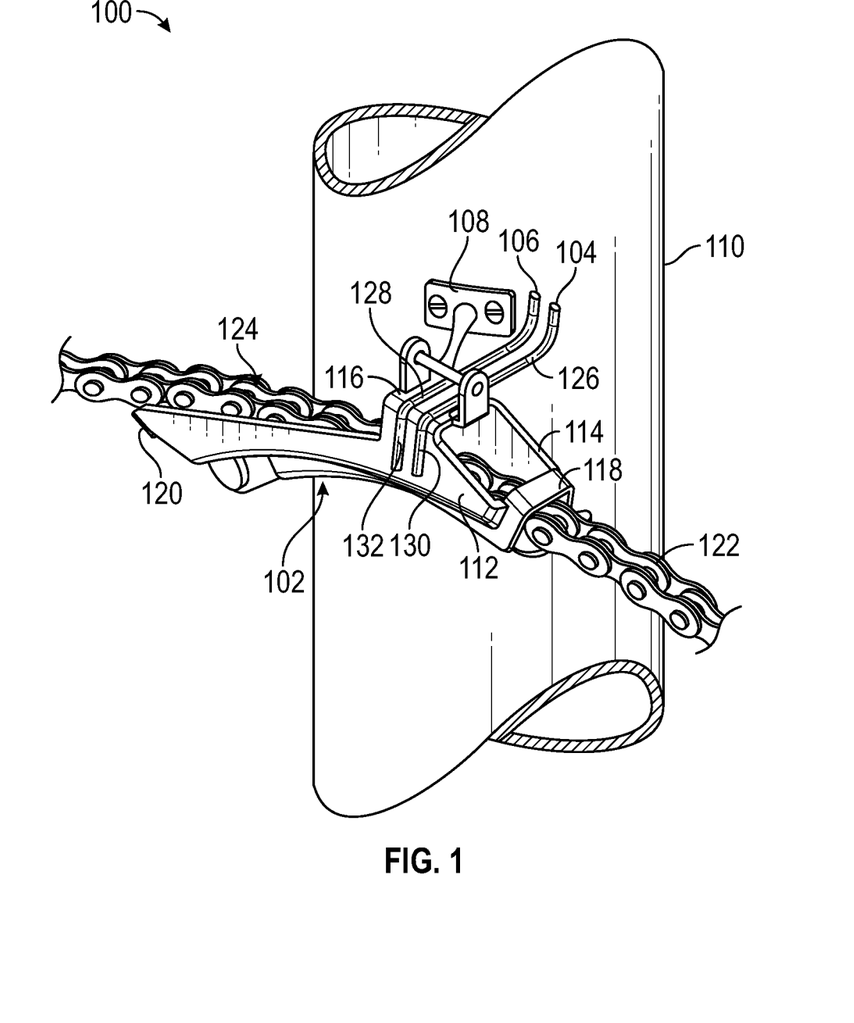
FIG. 1 illustrates an exemplary embodiment of a bicycle derailleur apparatus for controlling bicycle speed that addresses the needs of casual bicycle riders.
Figure 2:
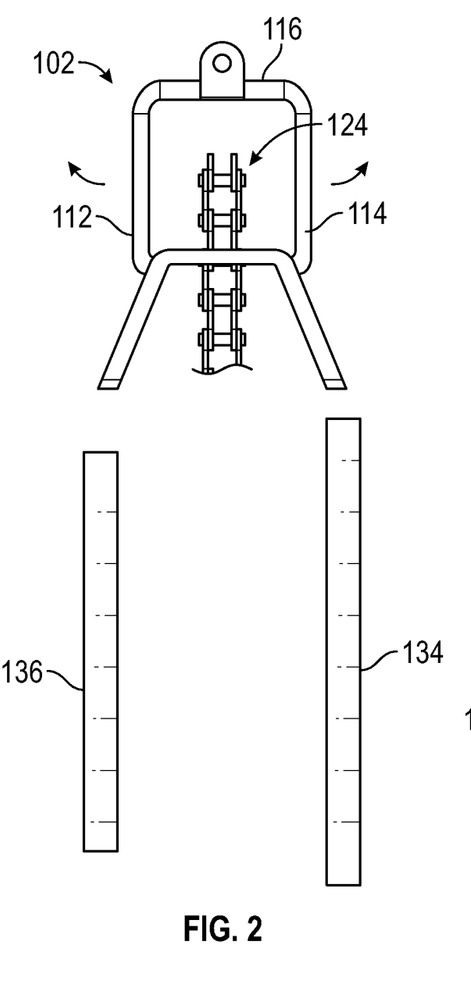
FIG. 2 illustrates, in a diagrammatic form, an end view of the exemplary embodiment of the bicycle derailleur apparatus having a pair of sprocket gears of different diameter sizes, a bicycle chain guide and a front one of a pair of moldable wires for shifting a bicycle chain from one to the other of the sprocket gears, showing the bicycle chain guide and the pair of moldable wires thereon being displaced along a bicycle chain from the pair of sprocket gears for shifting the bicycle chain from one to the other of the sprocket gears.
Figure 3:
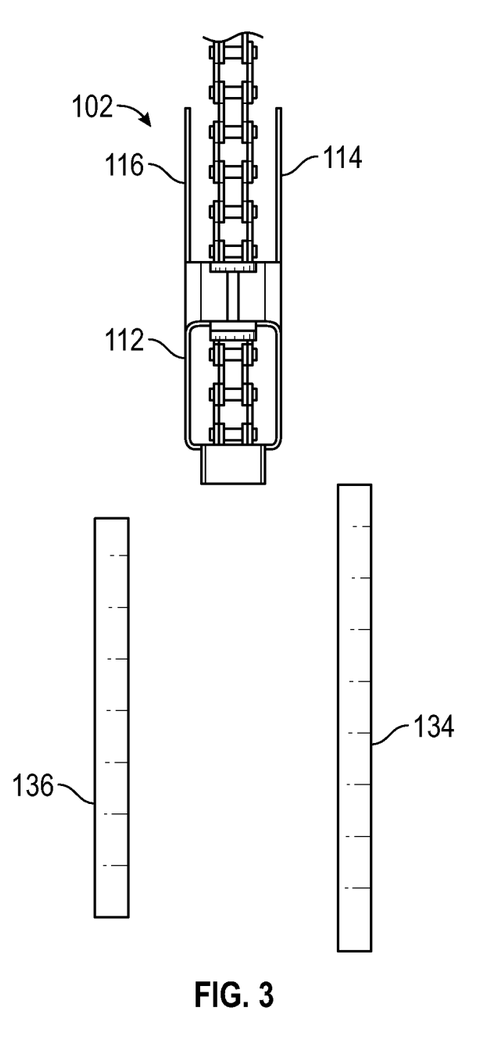
FIG. 3 illustrates, in a diagrammatic form, a top view of the exemplary embodiment of the bicycle derailleur apparatus of FIG. 2, showing the bicycle chain guide and the pair of moldable wires thereon displaced along the bicycle chain from the pair of sprocket gears.

The bicycle chain guide 102 has opposite outer and inner side walls 112, 114 (defining the opposite sides), spaced apart top walls 116, 118 that extend between and rigidly interconnect the opposite outer and inner side walls at forward locations thereon, and a bottom wall 120 that rigidly interconnects the opposite outer and inner side walls at a rearward location thereof. There is sufficient clearance between a bicycle chain 122 and the various walls 112-120 of the bicycle chain guide 102 such that the bicycle chain is moveable through and relative to an elongated channel 124 formed by the various walls of the bicycle chain guide. The bicycle chain guide 102 may be any suitable size, shape, or configuration.

The pair of elongated moldable wires 104, 106 have respective main portions 126, 128 disposed side-by-side and spaced apart from one another and being mounted to the bicycle frame portion 110. The moldable wires 104, 106 also have respective outer end portions 130, 132 attached to one side of the bicycle chain guide 102, as defined by either one of the side walls 112, 114 thereof. Upon applying a predetermined electric current to the moldable wires 104, 106 at separate time periods, the outer end portions 130, 132 deform from pliable states, as shown in FIG. 1, to respective acute and obtuse angular states relative to the main portions 126, 128, as diagrammatically shown in FIGS. 4 and 5. The acute angular shape of a respective one of the moldable wires 104, 106 may be in the form of a cantilever spring of a bent configuration in one direction. The obtuse angular shape of the respective other of the moldable wires 104, 106 may be in the form of another cantilever spring of a bent configuration in an opposite direction to the one direction. The pair of moldable wires 104, 106 may be any suitable size, shape, or configuration.

Figure 4:
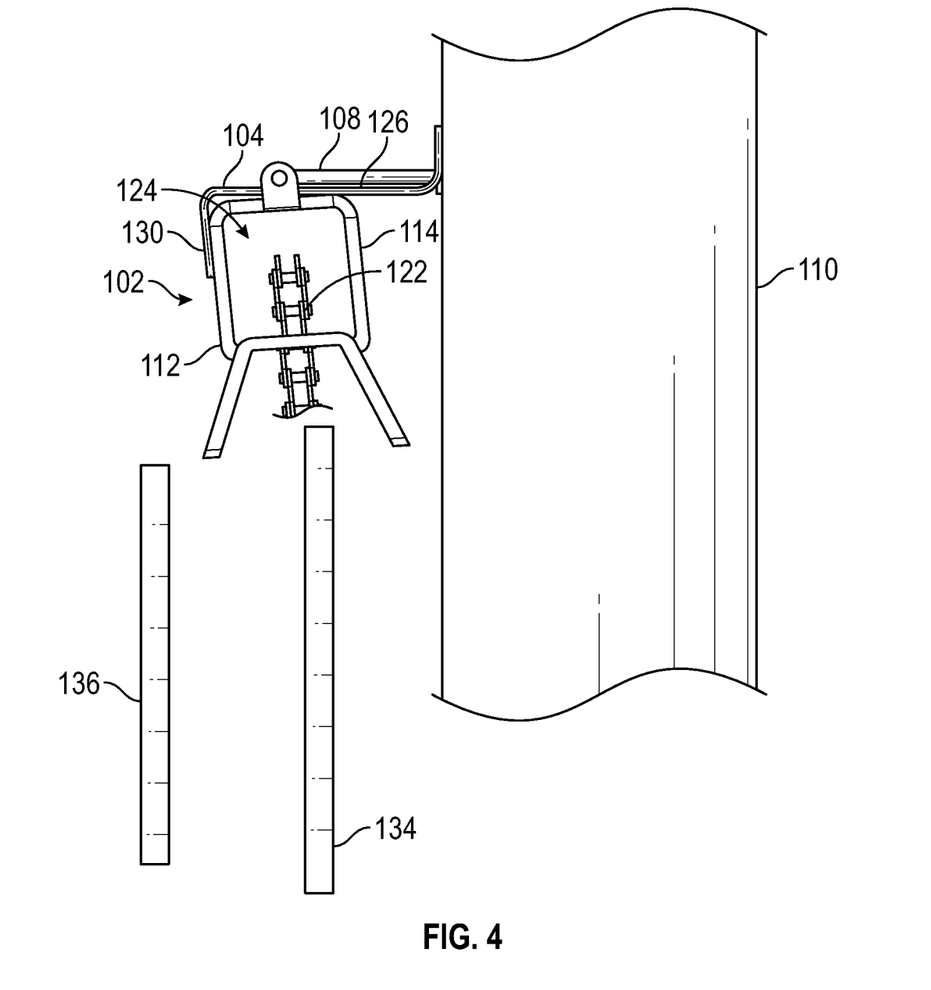
FIG. 4 illustrates, in a diagrammatic form, the exemplary embodiment of the bicycle derailleur apparatus with an outer end portion of one of the moldable wires deformed into an acute angular shape relative to a main portion thereof for causing lateral movement of the bicycle chain guide inward and shifting the bicycle chain from the outer sprocket gear to the inner one so as to enable an increase in the speed of the bicycle relative a given pedal cadence of the bicycle rider.
Figure 5:
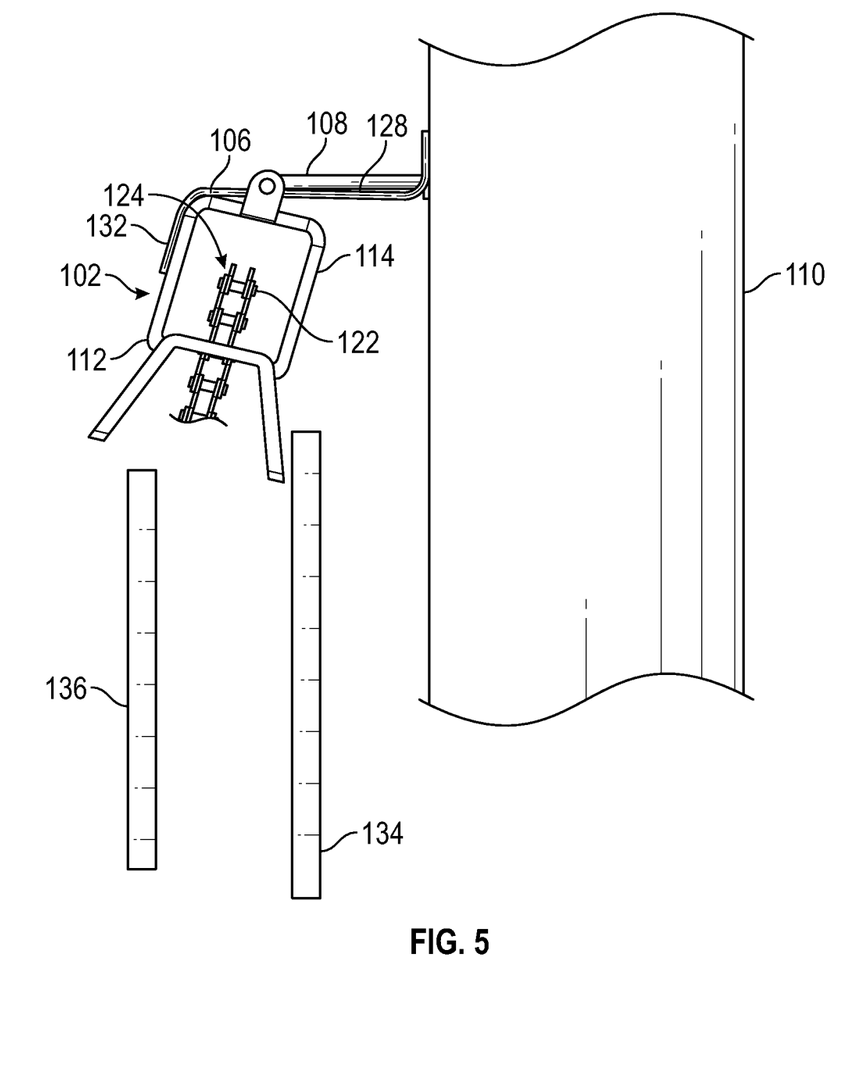
FIG. 5 illustrates, in a diagrammatic form, the exemplary embodiment of the bicycle derailleur apparatus with an outer end portion of the other of the moldable wires deformed into an obtuse angular shape relative to the main portion thereof for causing lateral movement of the bicycle chain guide outward and shifting the bicycle chain from the inner sprocket gear to the outer one so as to enable a decrease in the speed of the bicycle relative to the given pedal cadence of the bicycle rider.

As the outer end portions 130, 132 of the moldable wires 104, 106 are deformed to the respective acute and obtuse angular states during separate time periods, they cause movement of the bicycle chain guide 102 in the lateral direction transversely to the bicycle chain 122 to thereby shift the bicycle chain 122 into engagement with a corresponding one or the other of the inner and outer derailleur sprocket gears 134, 136 having different diameter sizes to increase or decrease the bicycle speed relative to a given pedal cadence of a rider. The bicycle may include any number of derailleur sprocket gears. For example, the moldable wires 104, 106 may push and pull the bicycle chain guide 102 into engagement with any number of derailleur sprocket gears. In some instances, in the case of a casual rider, the pedal cadence is commonly 60 ppm (pedal-cycles per minute). Any pedal cadence may be used herein.

In other instances, one of the moldable wires 104, 106 may be attached to outer side wall 112, while the other molded wire 104, 106 is attached to the inner side wall 114. In this manner, the moldable wires 104, 106 may push or pull the bicycle chain guide 102 as a current is applied thereto in the lateral direction transversely to the bicycle chain 122 to thereby shift the bicycle chain 122 into engagement with a corresponding one or the other of the inner and outer derailleur sprocket gears 134, 136 having different diameter sizes to increase or decrease the bicycle speed relative to a given pedal cadence of a rider. In some instances, only a single moldable wire may be incorporated into the derailleur apparatus 100. For example, in certain embodiments, one of the moldable wires 104, 106 may be attached to outer side wall 112 or the inner side wall 114.

The molded wires 104, 106, in response to application of the predetermined electric current thereto at the separate time periods, will reach a respective heated state at a predetermined temperature, such as about 100° C., such that their respective outer end portions maintain the respective acute and obtuse angular shapes relative to their main portions for the duration of the respective heated states. The molded wires 104, 106 may have an outer layer of heat-resistant insulation to prevent migration of heat to the exterior of the moldable wires. The predetermined electric current does not need to be constantly applied to the moldable wires 104, 106 to maintain their respective heated states, but instead may be received periodically so as to maintain the heated states. The molded wires 104, 106, in absence of the application of the predetermined electric current thereto for maintaining the respective heated states, assume respective unheated states such that the outer end portions 130, 132 of the molded wires are in the pliable states. In the pliable state each of the moldable wires 104, 106 fails to provide an opposing force to the movement of the other of the moldable wires when in the heated state.

Figure 6:
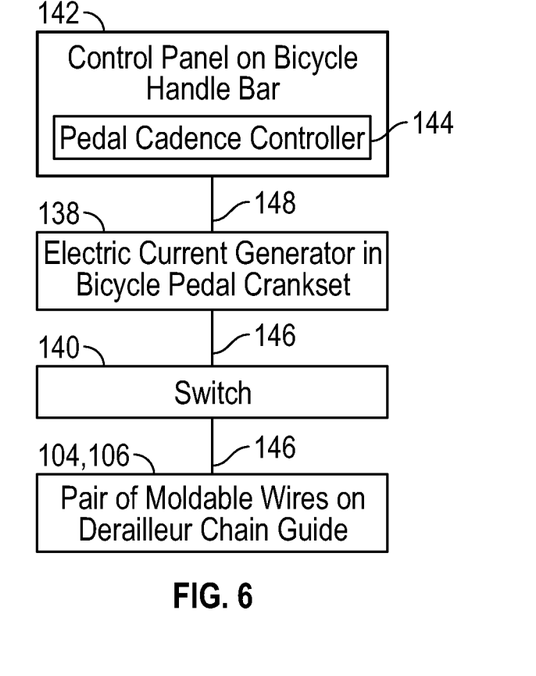
FIG. 6 illustrates, in a more detailed block diagram form, the exemplary embodiment of the bicycle derailleur apparatus for controlling bicycle speed which may also incorporate additional components in the form of an electric current generator, a switch to control to which one of the moldable wires the electric current is applied, and a pedal cadence controller.

Referring to FIG. 6, there is illustrated in a more detailed exemplary embodiment of the bicycle derailleur apparatus 100 further additional components which may be incorporated by the apparatus. For example, the bicycle derailleur apparatus 100 may include an electric current generator 138 which may be housed in a pedal crankset or elsewhere (not shown), a switch 140 which may be located on the electric current generator to control to which one of the moldable wires 104, 106 the electric current is applied, and a control panel 142 which may be mounted on the bicycle handlebar (not shown) having a pedal cadence controller 144 which acts like a rheostat depending on the desired pedal cadence entered by the rider. Other wires 146, 148 may be provided: one wire 146 to run between the electric current generator 138 and the moldable wires 104, 106 to carry the current; and another wire 148 to run between the electric current generator 138 and the control panel 142.

Referring finally to FIGS. 1-6, the bicycle derailleur apparatus 100 operates as follows. The rider selects the desired pedal cadence (ppm) on the control panel 142 mounted on the bicycle handlebar or elsewhere. The typical pedal cadence of a casual rider is 60 ppm. The pair of moldable wires 104, 106 may be incorporated by the apparatus 100, although additional paired moldable wires and different sprocket gears may be added to the apparatus. The two moldable wires 104, 106 will perform the automatic sprocket gear shifting, as described hereinbefore. One is mounted more to the front of the derailleur and the other more to the rear of the derailleur.

As the rider pedals slower, less current is generated by the electric current generator 138, which is in communication with the pedal crankset. As the rider pedals faster, more current is generated. Based on whether the actual pedal cadence is lower or higher than the selected pedal cadence, the apparatus 100 sends current to the one or the other moldable wires 106, 104, depending on whether a downshift or an upshift is desired. When the rider's actual pedal cadence is significantly lower than the selected pedal cadence, the apparatus 100 will send current to the molded wire 106 to increase heating thereof to alter its configuration to the obtuse angular shape to shift the derailleur chain guide 102 to the smaller diameter one of the sprocket gears. This is called downshifting. When the rider's actual pedal cadence is significantly higher than the selected pedal cadence, the apparatus 100 will send current to the molded wire 104 to increase heating thereof to alter its configuration to the acute angular shape to shift the derailleur change guide 102 to the larger diameter one of the sprocket gears. This is called upshifting. When the one of the moldable wires 104, 106 being fed the current heats up and returns to its preset "native" shape, the acute or obtuse angular shape, the other of the moldable wires 106, 104 takes on a pliable shape depending on the position of the derailleur chain guide 102 such that it has no significant opposing force. The electric current generator 138 must generate about 150 watts to achieve the shift.

By way of example, the moldable wires 104, 106 may be a commercially-available product designated as Niti Nitinol Nicket Titanium Super Elastic Wire having a 0.020 inch diameter. The electric current generator may be a commercially-available product designated as 150 W 775 DC Motor 120V/10000 RPM Large Torque High-Power Motor Spindle Motor.

Example Embodiments

In some instances, the following examples may be implemented together or separately by the systems and methods described herein.

Example 1 may include a bicycle derailleur apparatus for controlling bicycle speed, comprising: a bicycle chain guide being movable in a lateral direction toward and away from a bicycle frame portion to which the bicycle chain guide is mountable; and a pair of moldable wires attached to the bicycle chain guide such that upon applying a predetermined electric current to the moldable wires at separate time periods the moldable wires are deformable from pliable states to cause movement of the bicycle chain guide to shift the bicycle chain into engagement with a derailleur sprocket gear to increase or decrease a speed of a bicycle relative to a given pedal cadence of a rider.

Example 2 may include the apparatus as recited in example 1, wherein the bicycle chain guide comprises opposite sides for receiving a bicycle chain therebetween, wherein the pair of moldable wires comprise respective main portions disposed side-by-side and spaced apart from one another and being mountable to the bicycle frame portion, the moldable wires also having respective outer end portions attached to one side of the bicycle chain guide, and wherein the moldable wires are deformable from the pliable states to respective acute and obtuse angular shapes relative to the main portions thereof to shift the bicycle chain into engagement with one or the other of inner and outer derailleur sprocket gears of different diameter sizes.

Example 3 may include the apparatus as recited in example 2 and/or some other example herein, wherein the moldable wires, in response to application of the predetermined electric current to the moldable wires at separate time periods, attain a respective heated state at a predetermined temperature such that their respective outer end portions maintain the respective acute and obtuse angular shapes relative to their main portions for the duration of the respective heated state.

Example 4 may include the apparatus as recited in example 3 and/or some other example herein, wherein the outer end portions of the moldable wires attain the respective heated states at respective predetermined temperatures of about 100° C.

Example 5 may include the apparatus as recited in example 3 and/or some other example herein, wherein a respective one of the moldable wires, in absence of the application of the predetermined electric current thereto for maintaining the respective heated state, assumes a respective unheated state such that the outer end portion of the respective one of the molded wires is in the pliable state and thereby fails to provide an opposing force to the movement of the respective other of the moldable wires in the heated state.

Example 6 may include the apparatus as recited in example 2 and/or some other example herein, wherein the acute angular shape of a respective one of the moldable wires is in the form of a cantilever spring of a bent configuration in one direction, wherein the obtuse angular shape of the respective other of the moldable wires is in the form of another cantilever spring of a bent configuration in an opposite direction to the one direction.

Example 7 may include a bicycle derailleur apparatus for controlling bicycle speed, comprising: a bicycle chain guide having opposite sides for receiving a bicycle chain therebetween, the bicycle chain guide being movable in a lateral direction toward and away from a bicycle frame portion to which the bicycle chain guide is mountable and transversely to a fore-and-aft direction of the bicycle chain to thereby shift the bicycle chain into driving engagement with one or the other of inner and outer, side-by-side and spaced apart, derailleur sprocket gears having different diameter sizes to thereby change the speed of a bicycle relative to a given pedal cadence of a rider; and at least one pair of moldable wires having respective main portions extending in the lateral direction of movement of the bicycle chain guide and being disposed side-by-side and spaced apart from one another and mountable to the bicycle frame portion, one of the moldable wires having an outer end portion attached to either one of the opposite sides of the bicycle chain guide such that upon application of a predetermined electric current to the one moldable wire during a first time period the outer end portion of the one molded wire is deformable from a pliable state to an acute angular shape relative to the main portion thereof, the other of the moldable wires having an outer end portion attached to either one of the opposite sides of the bicycle chain guide such that upon application of a predetermined electric current to the other moldable wire during a second time period separate from the first time period the outer end portion of the other molded wire is deformable from a pliable state to an obtuse angular shape relative to the main portion thereof, wherein the deforming of the moldable wires to their respective acute and obtuse angular shapes during the separate time periods force the bicycle chain guide to move in the lateral direction and shift the bicycle chain into driving engagement with one or the other of the inner and outer derailleur sprocket gears to thereby increase or decrease the speed of the bicycle relative to the given pedal cadence of the rider.

Example 8 may include the control apparatus as recited in example 7, wherein the moldable wires, in response to application of the predetermined electric current to the moldable wires during the separate first and second time periods, reach a respective heated state at a predetermined temperature such that their respective outer end portions maintain the respective acute and obtuse angular shapes relative to their main portions.

Example 9 may include the control apparatus as recited in example 8 and/or some other example herein, wherein the outer end portions of the moldable wires reach the respective heated state at the respective predetermined temperature of about 100° C.

Example 10 may include the control apparatus as recited in example 8 and/or some other example herein, wherein each one of the moldable wires in absence of the application of the predetermined electric current thereto during the separate first and second time periods are in a respective unheated state such that their respective outer end portions maintain the respective pliable state relative to their main portions and thereby fail to provide an opposing force to the movement of each other of the moldable wires with their outer end portions in the respective one of the acute and obtuse angular shapes.

Example 11 may include the control apparatus as recited in example 7 and/or some other example herein, wherein the acute angular shape of the one moldable wire is in the form of a cantilever spring of a bent configuration in one direction.

Example 12 may include the control apparatus as recited in example 11 and/or some other example herein, wherein the obtuse angular shape of the other moldable wire is in the form of another cantilever spring of a bent configuration in an opposite direction to the one direction.

Example 13 may include a bicycle derailleur apparatus for controlling bicycle speed, comprising: a bicycle chain guide having opposite sides for receiving a bicycle chain therebetween, the bicycle chain guide being movable in a lateral direction toward and away from a bicycle frame portion to which the bicycle chain guide is mountable and transversely to a fore-and-aft direction of the bicycle chain to thereby shift the bicycle chain into driving engagement with one or the other of inner and outer, side-by-side and spaced apart, derailleur sprocket gears having different diameter sizes to thereby change the speed of a bicycle relative to a given pedal cadence of a rider; at least one pair of moldable wires having respective main portions extending in the lateral direction of movement of the bicycle chain guide and being disposed side-by-side and spaced apart from one another and mountable to the bicycle frame portion, one of the moldable wires having an outer end portion attached to either one of the opposite sides of the bicycle chain guide such that upon application of a predetermined electric current to the one moldable wire during a first time period the outer end portion of the one moldable wire is deformable from a pliable state to an acute angular shape relative to the main portion thereof, the other of the moldable wires having an outer end portion attached to either one of the opposite sides of the bicycle chain guide such that upon application of a predetermined electric current to the other moldable wire during a second time period separate from the first time period the outer end portion of the other moldable wire is deformable from a pliable state to an obtuse angular shape relative to the main portion thereof, wherein the deforming of the moldable wires in their respective acute and obtuse angular shapes during the separate time periods force the bicycle chain guide to move in the lateral direction and shift the bicycle chain into driving engagement with one or the other of the inner and outer derailleur sprocket gears to thereby increase or decrease the speed of the bicycle relative to the given pedal cadence of the rider; and an electric current generator installable in a pedal crankset of the bicycle and adapted to generate and send an electric current to a selected one or the other of the moldable wires in proportion to how fast the rider pedals the bicycle.

Example 14 may include the control apparatus as recited in example 13, further comprising a switch mountable proximate the electric current generator and being operable to control to which one of the moldable wires the predetermined electric current is applied during the separate time periods to reach the heated state at the predetermined temperature to cause deforming of the one moldable wire from the pliable state to the one of the acute or obtuse angular shape.

Example 15 may include the control apparatus as recited in example 14 and/or some other example herein, further comprising a pedal cadence controller mountable on a handlebar of the bicycle and operating as a rheostat to select the desired pedal cadence entered by the rider.

Example 16 may include the control apparatus as recited in example 13 and/or some other example herein, wherein the moldable wires, in response to application of the predetermined electric current to the moldable wires at separate time periods, reach a respective heated state at a predetermined temperature such that their respective outer end portions maintain the respective acute and obtuse angular shapes relative to their main portions.

Example 17 may include the control apparatus as recited in example 16 and/or some other example herein, wherein the outer end portions of the moldable wires reach the respective heated states at respective predetermined temperatures of about 100° C.

Example 18 may include the control apparatus as recited in example 16 and/or some other example herein, wherein each one of the moldable wires in absence of the application of the predetermined electric current thereto during the separate first and second time periods are in respective unheated states such that their respective outer end portions maintain the respective pliable states relative to their main portions and thereby fail to provide an opposing force to the movement of each other of the moldable wires with their outer end portions in the respective one of the acute and obtuse angular shapes.

Example 19 may include the control apparatus as recited in example 13 and/or some other example herein, wherein the acute angular shape of one of the moldable wires is in the form of a cantilever spring of a bent configuration in one direction.

Example 20 may include the control apparatus as recited in example 19 and/or some other example herein, wherein the obtuse angular shape of the other of the moldable wires is in the form of another cantilever spring of a bent configuration in an opposite direction to the one direction.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A bicycle derailleur apparatus for controlling bicycle speed, comprising:
    a bicycle chain guide being movable in a lateral direction toward and away from a bicycle frame portion to which the bicycle chain guide is mountable; and
    a pair of moldable wires attached to the bicycle chain guide such that upon applying a predetermined electric current to the moldable wires at separate time periods the moldable wires are deformable from pliable states to cause movement of the bicycle chain guide to shift a bicycle chain into engagement with a derailleur sprocket gear to increase or decrease a speed of a bicycle relative to a given pedal cadence of a rider.

2. The apparatus as recited in claim 1, wherein the bicycle chain guide comprises opposite sides for receiving the bicycle chain therebetween, wherein the pair of moldable wires comprise respective main portions disposed side-by-side and spaced apart from one another and being mountable to the bicycle frame portion, the moldable wires also having respective outer end portions attached to one side of the bicycle chain guide, and wherein the moldable wires are deformable from the pliable states to respective acute and obtuse angular shapes relative to the respective main portions thereof to shift the bicycle chain into engagement with an inner or an outer derailleur sprocket gears of different diameter sizes.

3. The apparatus as recited in claim 2, wherein the moldable wires, in response to application of the predetermined electric current to the moldable wires at separate time periods, attain a respective heated state at a predetermined temperature such that their respective outer end portions maintain the respective acute and obtuse angular shapes relative to their respective main portions for the duration of the respective heated state.

4. The apparatus as recited in claim 3 wherein the outer end portions of the moldable wires attain the respective heated states at respective predetermined temperatures of about 100° C.

5. The apparatus as recited in claim 3 wherein a respective one of the moldable wires, in absence of the application of the predetermined electric current thereto for maintaining the respective heated state, assumes a respective unheated state such that the outer end portion of the respective one of the molded wires is in the pliable state and thereby fails to provide an opposing force to the movement of the respective other of the moldable wires in the heated state.

6. The apparatus as recited in claim 2 wherein the acute angular shape of a respective one of the moldable wires is in the form of a cantilever spring of a bent configuration in one direction, wherein the obtuse angular shape of the respective other of the moldable wires is in the form of another cantilever spring of a bent configuration in an opposite direction to the one direction.

7. A bicycle derailleur apparatus for controlling bicycle speed, comprising:
    a bicycle chain guide having opposite sides for receiving a bicycle chain therebetween, the bicycle chain guide being movable in a lateral direction toward and away from a bicycle frame portion to which the bicycle chain guide is mountable and transversely to a fore-and-aft direction of the bicycle chain to thereby shift the bicycle chain into driving engagement with an inner or an outer, side-by-side and spaced apart, derailleur sprocket gears having different diameter sizes to thereby change the speed of a bicycle relative to a given pedal cadence of a rider; and
    at least one pair of moldable wires having respective main portions extending in the lateral direction of movement of the bicycle chain guide and being disposed side-by-side and spaced apart from one another and mountable to the bicycle frame portion, one of the moldable wires having an outer end portion attached to either one of the opposite sides of the bicycle chain guide such that upon application of a predetermined electric current to the one moldable wire during a first time period, the outer end portion of the one moldable wire is deformable from a pliable state to an acute angular shape relative to the main portion of the one moldable wire thereof, the other of the moldable wires having an outer end portion attached to either one of the opposite sides of the bicycle chain guide such that upon application of a predetermined electric current to the other moldable wire during a second time period separate from the first time period, the outer end portion of the other moldable wire is deformable from a pliable state to an obtuse angular shape relative to the main portion of the other moldable wire thereof, wherein the deforming of the moldable wires to their respective acute and obtuse angular shapes during the first and second time periods force the bicycle chain guide to move in the lateral direction and shift the bicycle chain into driving engagement with one or the other of the inner and outer derailleur sprocket gears to thereby increase or decrease the speed of the bicycle relative to the given pedal cadence of the rider.

8. The control apparatus as recited in claim 7, wherein the moldable wires, in response to application of the predetermined electric current to the moldable wires during the separate first and second time periods, reach a respective heated state at a predetermined temperature such that their respective outer end portions maintain the respective acute and obtuse angular shapes relative to their respective main portions.

9. The control apparatus as recited in claim 8, wherein the outer end portions of the moldable wires reach the respective heated state at the respective predetermined temperature of about 100° C.

10. The control apparatus as recited in claim 8 wherein each one of the moldable wires in absence of the application of the predetermined electric current thereto during the separate first and second time periods are in a respective unheated state such that their respective outer end portions maintain the respective pliable state relative to their respective main portions and thereby fail to provide an opposing force to the movement of each other of the moldable wires with their outer end portions in the respective one of the acute and obtuse angular shapes.

11. The control apparatus as recited in claim 7, wherein the acute angular shape of the one moldable wire is in the form of a cantilever spring of a bent configuration in one direction.

12. The control apparatus as recited in claim 11, wherein the obtuse angular shape of the other moldable wire is in the form of another cantilever spring of a bent configuration in an opposite direction to the one direction.

13. A bicycle derailleur apparatus for controlling bicycle speed, comprising:
    a bicycle chain guide having opposite sides for receiving a bicycle chain therebetween, the bicycle chain guide being movable in a lateral direction toward and away from a bicycle frame portion to which the bicycle chain guide is mountable and transversely to a fore-and-aft direction of the bicycle chain to thereby shift the bicycle chain into driving engagement with an inner or an outer, side-by-side and spaced apart, derailleur sprocket gears having different diameter sizes to thereby change the speed of a bicycle relative to a given pedal cadence of a rider;

at least one pair of moldable wires having respective main portions extending in the lateral direction of movement of the bicycle chain guide and being disposed side-by-side and spaced apart from one another and mountable to the bicycle frame portion, one of the moldable wires having an outer end portion attached to either one of the opposite sides of the bicycle chain guide such that upon application of a predetermined electric current to the one moldable wire during a first time period, the outer end portion of the one moldable wire is deformable from a pliable state to an acute angular shape relative to the main portion of the one moldable wire thereof, the other of the moldable wires having an outer end portion attached to either one of the opposite sides of the bicycle chain guide such that upon application of a predetermined electric current to the other moldable wire during a second time period separate from the first time period, the outer end portion of the other moldable wire is deformable from a pliable state to an obtuse angular shape relative to the main portion of the other moldable wire thereof, wherein the deforming of the moldable wires in their respective acute and obtuse angular shapes during the first and second time periods force the bicycle chain guide to move in the lateral direction and shift the bicycle chain into driving engagement with one or the other of the inner and outer derailleur sprocket gears to thereby increase or decrease the speed of the bicycle relative to the given pedal cadence of the rider; and an electric current generator installable in a pedal crankset of the bicycle and adapted to generate and send an electric current to a selected one or the other of the moldable wires in proportion to how fast the rider pedals the bicycle.

14. The control apparatus as recited in claim 13, further comprising a switch mountable proximate the electric current generator and being operable to control to which one of the moldable wires the predetermined electric current is applied during the first and second time periods to reach a heated state at a predetermined temperature to cause deforming of the one or the other moldable wire from the pliable state to the one of the acute or obtuse angular shape.

15. The control apparatus as recited in claim 14, further comprising a pedal cadence controller mountable on a handlebar of the bicycle and operating as a rheostat to select the desired pedal cadence entered by the rider.

16. The control apparatus as recited in claim 13, wherein the moldable wires, in response to application of the predetermined electric current to the moldable wires at first and second time periods, reach a respective heated state at a predetermined temperature such that their respective outer end portions maintain the respective acute and obtuse angular shapes relative to their respective main portions.

17. The control apparatus as recited in claim 16, wherein the outer end portions of the moldable wires reach the respective heated states at respective predetermined temperatures of about 100° C.

18. The control apparatus as recited in claim 16, wherein each one of the moldable wires in absence of the application of the predetermined electric current thereto during the separate first and second time periods are in respective unheated states such that their respective outer end portions maintain the respective pliable states relative to their respective main portions and thereby fail to provide an opposing force to the movement of each other of the moldable wires with their outer end portions in the respective one of the acute and obtuse angular shapes.

19. The control apparatus as recited in claim 13, wherein the acute angular shape of one of the moldable wires is in the form of a cantilever spring of a bent configuration in one direction.

20. The control apparatus as recited in claim 19, wherein the obtuse angular shape of the other of the moldable wires is in the form of another cantilever spring of a bent configuration in an opposite direction to the one direction.

* * * * *